F. MÜLLER.

CUTTER GRINDING MACHINE.

APPLICATION FILED MAY 3, 1921.

Reissued Oct. 11, 1921.

15,206.

4 SHEETS—SHEET 1.

Inventor
Friederich Müller
By Joseph H. Schofield
Attorney

F. MÜLLER.

CUTTER GRINDING MACHINE.

APPLICATION FILED MAY 3, 1921.

Reissued Oct. 11, 1921.

15,206.

4 SHEETS—SHEET 2.

Inventor
Friederich Müller
By Joseph N. Schofield
Attorney

F. MÜLLER.

CUTTER GRINDING MACHINE.

APPLICATION FILED MAY 3, 1921.

Reissued Oct. 11, 1921.

15,206.

4 SHEETS—SHEET 3.

Inventor
Friedrich Müller
By Joseph R. Schofield
Attorney

F. MÜLLER.

CUTTER GRINDING MACHINE.

APPLICATION FILED MAY 3, 1921.

Reissued Oct. 11, 1921. 15,206.

4 SHEETS—SHEET 4.

Inventor
Friederich Müller
By Joseph H. Schofield
Attorney

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

CUTTER-GRINDING MACHINE.

15,206. Specification of Reissued Letters Patent. Reissued Oct. 11, 1921.

Original No. 1,338,320, dated April 27, 1920, Serial No. 253,871, filed September 13, 1918. Application for reissue filed May 3, 1921. Serial No. 466,594.

*To all whom it may concern:*

Be it known that I, FRIEDERICH MÜLLER, a citizen of the United States, residing at Hartford, in the county of Hartford and State of Connecticut, have invented certain new and useful Improvements in Cutter-Grinding Machines, of which the following is a specification.

A machine embodying the invention is particularly adapted for grinding the front radial or approximately radial faces of milling cutters and other analogous tools such as taps and reamers. The machine is primarily intended for the grinding of cutters having teeth with inclined or helicoidal front cutting faces, but the machine is not limited to such use and is equally well adapted for grinding cutters having teeth with straight cutting faces parallel with the cutter axes. The machine can also be used for grinding the external or peripheral faces of cutter teeth.

One of the objects of the invention is to provide an improved cutter grinding machine in which use is made of a grinding wheel having a conical grinding face, adapted to have line contact with the radial tooth faces. The cutters to be ground can have either plane or helicoidal cutting faces, and in either case the machine can be readily adjusted to accommodate cutters of different diameters without interfering with the correct operative relationship between the grinding wheel and the cutters. Another object of the invention is to provide improved means for holding and turning the cutters and for effecting adjustments to conform to cutters having different degrees of inclination. A further object of the invention is to provide a wheel dressing mechanism having a novel relationship to the wheel and to the other parts of the machine which enables the wheel to be dressed without changing the effective grinding position thereof. Further objects of the invention are to secure certain improved features of construction and arrangement of parts which will be fully apparent from the following specification and claims.

In the accompanying drawings I have shown the embodiment of the invention which is now deemed preferable, but it will be understood that the drawings are for illustrative purposes only and are not to be construed as defining or limiting the scope of the invention, the claims appended to the specification being relied upon for that purpose.

Figure 1:
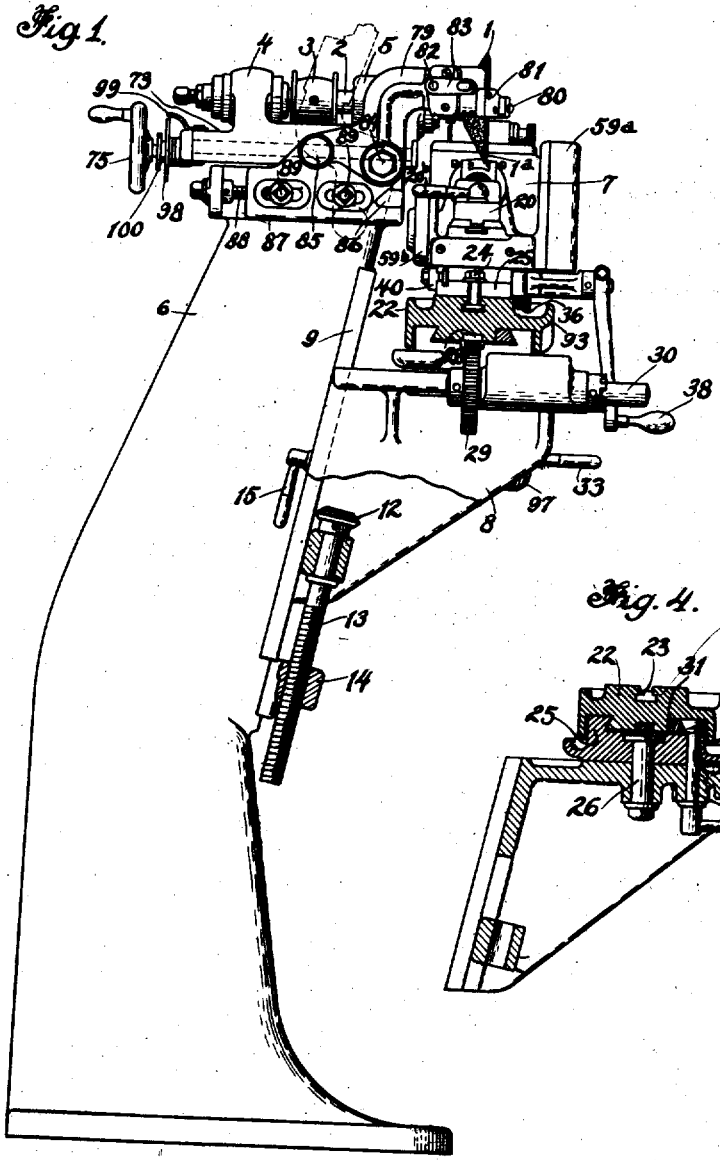
Figure 1 is a side view of a machine embodying the invention.
Figure 4:
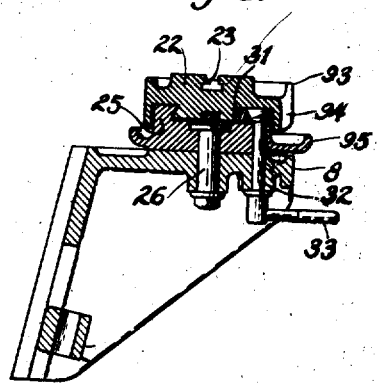
Fig. 4 is a fragmentary vertical sectional view taken along the line 4—4 of Fig. 2.
Figure 2:
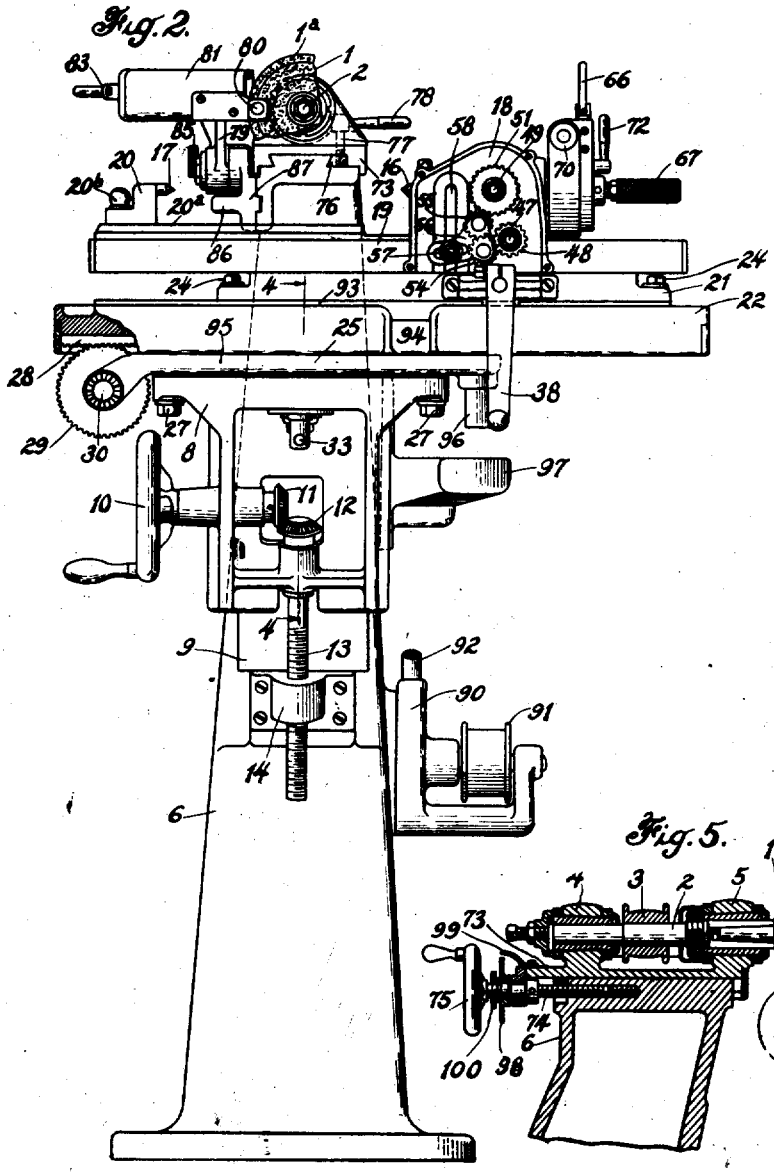
Fig. 2 is a front view.

The machine is adapted for grinding cutters, particularly those requiring grinding on the front cutting faces of their teeth. While suitable for all kinds of cutters of this class it is especially useful for cutters with teeth having helicoidal front cutting faces. Obviously, these warped helicoidal cutting faces cannot be ground by a wheel having a plane grinding face. The wheel must have a grinding face which is conical, all radial lines being inclined with respect to the wheel axis. If the helicoidal cutting faces of a cuttter are radial, as will be assumed, the cutter to be ground must be held in such a position that its axis will intersect the line of contact between the wheel and the face being ground. The cutters will vary considerably in diameter, and relative adjustment must accordingly be effected between the wheel and cutter holder. In accordance with the invention, this adjustment is effected along lines which are inclined with respect to the wheel axis and which are parallel with the conical surface of the wheel at the line of engagement with the tooth faces. On account of this adjustment along inclined lines it is possible to change the position of the cutter holder without interfering with the proper relationship between the grinding wheel and the cutter axis.

The grinding wheel is preferably adjustable longitudinally of its axis, so as to maintain the aforesaid intersection notwithstanding changes in the wheel surface as the result of dressing. Preferably there is provided in combination with the parts above referred to, a wheel dressing tool which is movable along a normally fixed line, the aforesaid adjustment of the wheel serving to bring it into renewed engagement with the dressing tool as the wheel wears. The dressing tool is so positioned as to maintain the grinding surface of the wheel in the proper relation to the cutter axis.

For grinding cutters with inclined or helicoidal cutting faces the cutter axes must be arranged at an angle to the wheel axis and this angle must vary with the degree of inclination of the cutting faces. I therefore provide means whereby the cutter holder can be angularly adjusted about a pivotal axis which preferably is perpendicular to the cutter axis and to the wheel axis intersecting both of them. It is therefore possible to adjust the cutter holder angularly without disturbing the before mentioned relation of the cutter axis and the line of engagement of the wheel with the cutter faces.

The grinding wheel is indicated at 1, this wheel being mounted on a rotatable spindle 2 driven by a belt pulley 3. The spindle 2 is carried by suitable bearings 4 and 5 mounted on the main frame 6 of the machine. The grinding wheel 1 has a grinding face $1^a$ which is slightly convex and conical in form, all axial lines of the face being inclined with respect to the wheel axis. A conical grinding face such as the face $1^a$ is necessary in order to enable the wheel to have line contact with the warped helicoidal front faces of the teeth. If the grinding face were plane instead of conical it obviously would not have line contact with the warped front faces but would tend to intersect them and thus mutilate and destroy them. The exact angle of the cutting face $1^a$ will depend to some extent on the pitch of the helicoidal cutting faces to be ground, but for ordinary practice an angle of about 12°, as shown, is satisfactory. Preferably the wheel has a second face $1^b$ which is also convex and conical in form. The two faces meet at the periphery of the wheel, thus providing a narrow periphery which enables the wheel to enter the narrow grooves between the teeth of cutters.

Figure 5:
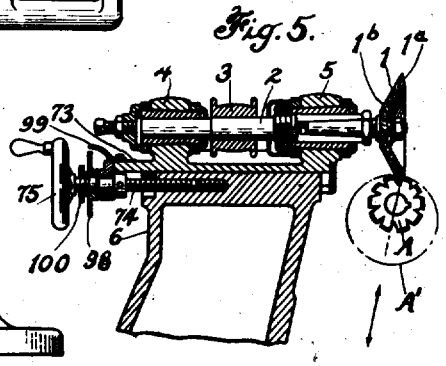
Fig. 5 is a fragmentary vertical sectional view taken along the line 5—5 of Fig. 3.

There is provided a cutter holder 7 which is adapted to hold a cutter A in the position indicated in Fig. 5 and to present the faces of the teeth successively to the wheel for grinding. The cutter holder 7 holds the cutter A in a position such that the axis of the cutter intersect the line of contact between the face $1^a$ and the tooth face being ground. In this way the faces of the teeth are ground radial throughout. Relative adjustment can be effected between the cutter holder and the wheel in order to accommodate cutters of different diameters. This relative adjustment is effected in the direction indicated in Fig. 5; that is, along lines parallel with the grinding face $1^a$ of the wheel. As before stated, the face $1^a$ is conical, the line of grinding contact being inclined with respect to the wheel axis. The relative adjustment therefore takes place along lines inclined with respect to the wheel axis and the result is that the line of grinding always intersects the axis of the cutter irrespective of the cutter diameter.

As illustrated, the axis of the wheel 1 and of the spindle 2 is horizontal and the line of movement of the cutter holder is inclined; and the wheel and its spindle are normally fixed against bodily movement and relative adjustment is effected by bodily moving the cutter holder. This construction is preferable for various reasons, but it may be modified without departing from the spirit of the invention in its broader phases.

In the preferred embodiment of the invention there is provided a knee 8 which is movable along an inclined slide 9 on the main frame 6. The angle of inclination of the slide 9 is the same as that of the grinding face $1^a$ of the grinding wheel. Rotatably mounted in a bearing in the knee is a horizontal shaft having a hand wheel 10 at its outer end and a bevel gear 11 at its inner end. The bevel gear 11 meshes with a bevel gear 12 at the upper end of an adjusting screw 13. The end of the screw fits a bearing in the knee and the lower threaded end of the screw engages a nut or threaded boss 14 on the main frame. By means of the hand wheel the screw 13 can be turned, thus raising or lowering the knee, the knee moving along inclined lines as before stated. After adjustment, the knee can be locked by means of a gib controlled by a handle 15.

Figure 6:
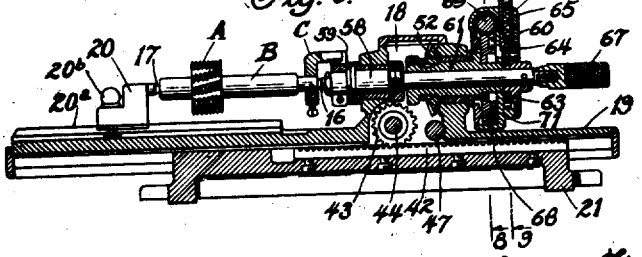
Fig. 6 is a fragmentary vertical sectional view taken along the line 6—6 of Fig. 3.
Figure 7:
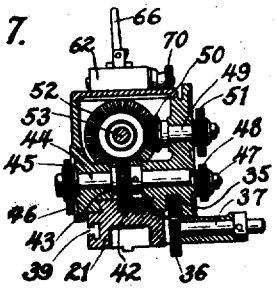
Fig. 7 is a fragmentary vertical sectional view taken along the line 7—7 of Fig. 3, the crank being omitted.
Figure 8:
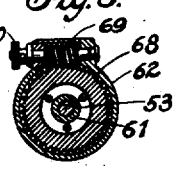
Fig. 8 is a fragmentary vertical sectional view taken along the line 8—8 of Fig. 6.
Figure 9:
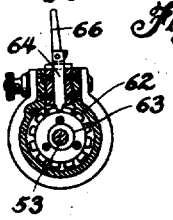
Fig. 9 is a fragmentary vertical sectional view taken along the line 9—9 of Fig. 6.

In Fig. 6 the cutter A is shown as being a thread cutting hob, but it will be understood that a cutter of this type has been selected merely by way of illustration and that any form of cutter may be ground. The cutter is mounted on an arbor B which is mounted between live and dead centers 16 and 17 forming parts of the cutter holder. The live center 16 is carried by a controlling and indexing head 18 mounted on a table 19. The dead center 17 is carried by a tailstock 20 which is also mounted on the table 19 and which is adjustable longitudinally thereof along a suitable guideway 20[a]. A handle 20[b] is provided for locking the tailstock in adjusted position.

The table 19 is supported on the knee 8 and is angularly adjustable with respect to the knee about a vertical axis which intersects the axis of the cutter and which also intersects the axis of the grinding wheel. In order that certain necessary or desirable changes and adjustments may be effected, the table 19 is not directly pivoted to the knee 8 but is connected to certain intermediate parts now to be described. The table 19 is longitudinally slidably mounted on a saddle 21 which in turn is adjustably secured to a carriage 22. The carriage 22 has a T-slot 23 into which extend T-bolts 24, 24 engaging the saddle 21. By means of these bolts the saddle can be connected to the carriage at any desired position. The carriage 22 is longitudinally slidably mounted on a turntable 25 which is pivotally mounted on the knee 8, being connected therewith by means of a pivot bolt 26. The turntable 25 can be secured in angularly adjusted position by means of bolts 27, 27.

For moving the carriage 22 longitudinally along the turntable 25, there is provided a longitudinal rack 28 secured to the carriage, and a spur gear 29 meshing with the rack and mounted on a horizontal shaft 30. The shaft 30 is carried by suitable bearings on the turntable and it may be turned by a suitable crank which is not shown. By turning the shaft 30 together with the gear 29, the carriage 22 may be moved as required. The carriage 22 can be held in its adjusted position with respect to the turntable by means of a gib 31 controlled by a screw 32 and a handle 33. The screw 32 extends through a slot 34 in the knee, thus permitting the turntable to be adjusted angularly.

In order that the table 19 may be easily moved forward and backward longitudinally to carry the cutter past the grinding wheel and thus effect grinding of the successive teeth, the following mechanism is provided. The table 19 carries a rack 35 which is engaged by a spur gear 36. This gear is mounted on a short transverse shaft 37 which is rotatably mounted on the saddle 21 and which carries a crank 38. It will be seen that by turning this crank the operator can move the table 19 forward and backward as desired. The saddle 21 is provided at its rear side with a T-slot 39 by means of which two stops 40 are adjustably secured in place, only one such stop being shown in the drawing. These stops are adapted to be engaged by a lug 41 on the table thus limiting the extent of table movement.

Figure 3:
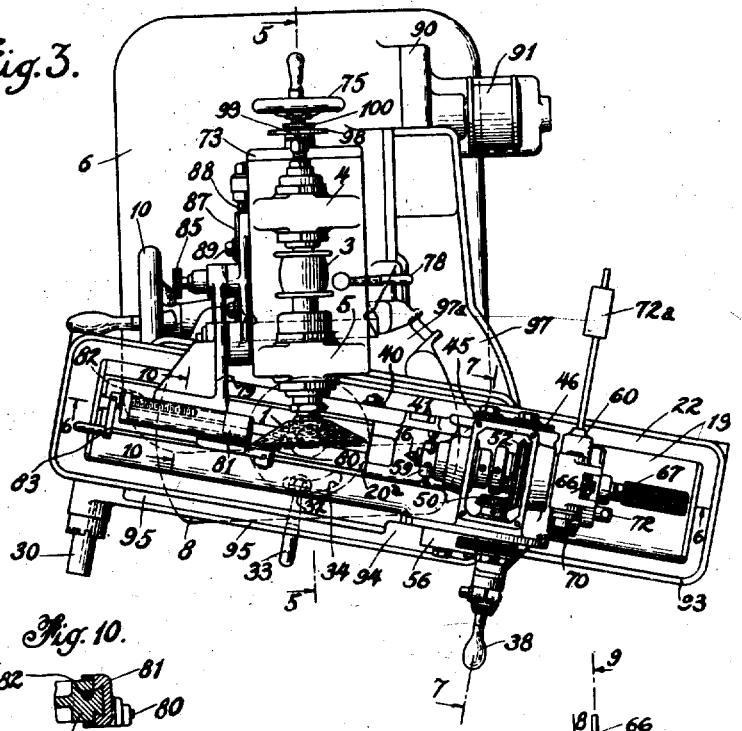
Fig. 3 is a plan view with the table and associated parts swung to a position different from that indicated in Figs. 1 and 2.
Figure 10:
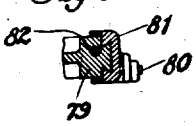
Fig. 10 is a fragmentary vertical sectional view taken along the line 10—10 of Fig. 3.

When the cutter to be ground has inclined helicoidal cutting faces, as shown, the turntable 25 together with the parts carried thereby must be turned to an angle corresponding to the angle of inclination of the cutting faces. These parts are shown so turned in Fig. 3. It will be noted that, inasmuch as the vertical pivotal axis of the turntable intersects the axis of the cutter, the turning movement does not disturb the relationship between the cutter axis and the line of grinding contact on the wheel. This line continues to intersect the cutter axis, thus remaining in position to grind the cutting faces radially.

As the cutter is moved longitudinally to effect grinding, it must obviously be simultaneously turned in order to maintain contact with the grinding wheel. The rate of turning must be exactly proportional to the rate of longitudinal movement and must further more be in exact accord with the angle of inclination of the cutting faces. For effecting this turning movement the following mechanism is provided. A longitudinal rack 42 is carried by the saddle 21 and this rack is engaged by a spur gear 43. The gear 43 is secured to a transverse horizontal shaft 44 rotatably mounted in the head 18. At the outer rear end of the shaft 44 is a gear 45 which meshes with a gear 46 on a second transverse horizontal shaft 47. The shaft 47 carries at its front end a gear 48. A third transverse horizontal shaft 49 is mounted in the head 18. This shaft carries at its inner end a bevel gear 50 and at its outer end a spur gear 51. The bevel gear 50 meshes with a bevel gear 52 on a longitudinal spindle 53, the spindle 53 carrying the aforesaid center 16. Interposed between the gears 48 and 51 are two meshing idler gears 54 and 55. These gears are carried by a plate 56 which is adjustable, being held by a bolt 57 which enters a slot 58 in the side of the head. It will be seen that when the table 19 is moved the gear 43 will roll along the rack 42 and thus be given a rotative movement. This rotative movement will be transmitted through the gears 45 and 46, through the shaft 47, through the gears 48, 54, 55, and 51 and through the shaft 49 to the bevel gear 50. From the bevel gear 50 the motion is transmitted to the bevel gear 52 and thence to the spindle 53. The spindle 53 is provided with a clamp 59 which is adapted to engage a dog C secured to the arbor B. In this way the rotative movement of the spindle is transmitted to the arbor and to the cutter. The amount of rotative movement of the spindle and of the cutter must be changed for different angles of inclination of the cutting faces. Such changes can be effected by removing one or the other or both of the gears 48 and 51 and substituting others of different diameters, the gears 54 and 55 being moved to mesh with such differently diametered gears.

I have shown a cutter having left-hand grooves. If a cutter with right-hand grooves is to be ground, it will be understood that the turntable and all of the associated parts must be adjusted to the angle opposite to that shown. In addition, the direction of rotative motion of the cutter must be changed. This change is effected by so positioning the plate 56 that motion is transmitted from the gear 48 to the gear 51 through only one of the gears 54 and 55.

The gears are ordinarily inclosed by covers 59ᵃ and 59ᵇ which are shown in Fig. 1 but which are omitted in the other figures.

It will be clear that after the face of each tooth of the cutter has been ground, the cutter must be indexed to prepare for the grinding of the next face. In order that indexing may be effected, the bevel gear 52, instead of being directly connected with the spindle 53, is indirectly connected through an indexing head 60. This head is mounted to move angularly with the spindle during the grinding of a tooth, but it will be understood that the head moves through only a small angle and never through a complete revolution.

The bevel gear 52 is secured to a sleeve 61 which is rotatably mounted on the spindle 53. Connected with the sleeve 61 and normally movable therewith is a housing 62 which incloses an index plate 63 secured to the spindle 53. This index plate is provided with a series of notches, the plate having the same number of notches as the cutter to be ground has cutting faces. Slidably mounted in the housing 62 is a detent 64 which is adapted to enter one or another of the notches in the index plate and thus rigidly connect the gear 52 with the spindle 53. The detent 64 is normally pressed into engagement with the plate 63 by means of a spring 65. The detent can be withdrawn by means of a manually operable lever 66. To effect indexing, the detent is withdrawn from engagement with the plate and the spindle 53 is then turned by means of a knurled handle 67. The detent is allowed to enter the next notch of the plate and the machine is then ready for the grinding of the next tooth of the cutter.

In order for grinding to be properly effected, it is necessary to provide means whereby the cutter may be turned about its axis independently of the longitudinal movement. In this way the cutting faces will be brought into proper relation to the grinding wheel so that grinding may be effected to the required extent. In order that this angular adjustment may be brought about, the housing 62 is adjustably connected with a sleeve 61. The sleeve 61 carries a worm wheel 68 which meshes with a worm 69 rotatably mounted in the housing 62. For turning the worm there is provided a knurled knob 70. It will be seen that by turning the worm 69 the housing 62 together with the index plate and the spindle and the cutter may be turned with respect to the sleeve 61, thus varying the relation between the cutter faces and the grinding wheel. After adjustment, the housing can be locked against relative movement by means of a bolt entering a T-slot 71 in the worm wheel 68. This bolt can be tightened by means of a handle 72.

Preferably in order to take up lost motion in the gearing and in the indexing and adjusting mechanism there is provided a counterweight 72ᵃ secured to the housing 62.

The grinding wheel 1 must be dressed from time to time, but its grinding surface 1ᵃ must be maintained in the same position after dressing. The wheel is therefore bodily adjustable longitudinally of its axis. The spindle bearings 4 and 5 are mounted on a slide 73 which is movable along a guideway on the main frame 6. For moving the slide 73 there is provided a screw 74 controlled by a hand wheel 75. The slide 73 can be clamped in adjusted position by means of a gib 76 which can be tightened by means of a screw 77 and a handle 78.

Preferably there is provided a stop which is so located that the wheel, when engaging the stop, is so positioned that an element of its surface perpendicularly intersects the cutter axis. By preference the stop is in the form of a dressing tool which is mounted as a permanent part of the machine. This tool is so mounted that its operative movement is always along a fixed line, advantage being taken of the before described adjustability of the wheel to move the wheel into engagement with the dressing tool. In this way the grinding surface of the wheel is maintained always in the same position, notwithstanding the dressing action. As illustrated, there is a bracket 79 carried by the main frame and serving to hold a dressing tool 80. The tool is preferably positioned for movement along a line intersecting the wheel axis, the line being preferably horizontal. This line is at the proper angle to the wheel axis to enable the tool to dress the surface 1ᵃ of the wheel at the correct predetermined angle. The dressing tool 80 is carried by a slide 81 which is movable along a guideway on the bracket 79. For moving the slide there is provided a screw 82 operable by a handle 83.

As a matter of convenience, it is sometimes preferable to move the dressing tool out of operative position when not in use, as shown by dotted lines in Fig. 1. In order that this may be done, the bracket 79 is mounted on a pivot bolt 84 so that the bracket with the slide 81 and the tool 80 may be swung backward and upward. For holding the bracket in the operative position there is provided a screw having a knurled head 85. When the screw has been withdrawn the bracket can be swung upward, the movement being limited by means of a stop 86.

It has already been stated that the dressing tool is normally movable along a fixed line. In order that the tool may be preliminarily adjusted to this fixed line and in order that it may be further adjusted to compensate for wear, it is mounted on a slide 87, this slide carrying the pivot bolt 84 and the stop 86. The slide 87 is horizontally adjustable with respect to the main frame 6, being movable under the control of a screw 88. Bolts 89, 89 extending through slots in the slide serve to lock it in adjusted position.

Figure 11:
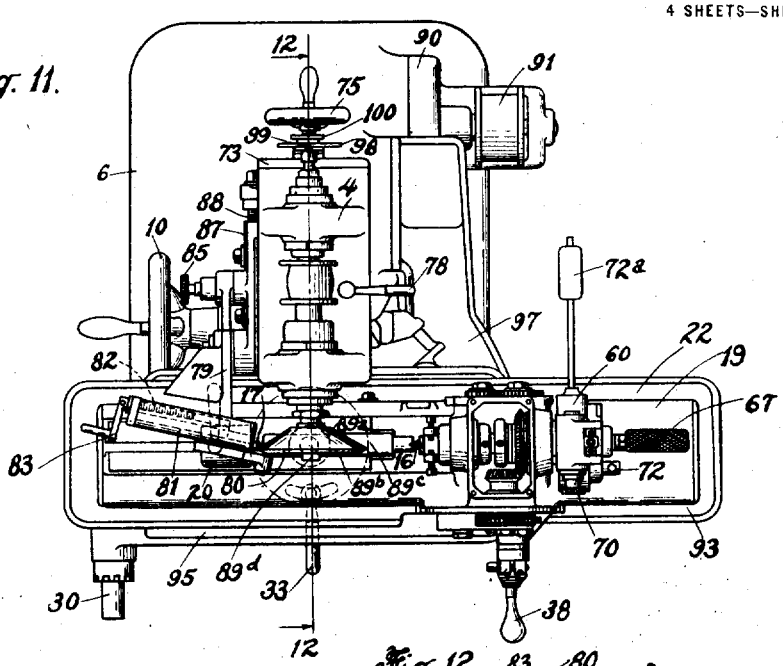
Fig. 11 is a plan view showing the gage for setting the dressing tool.
Figure 12:
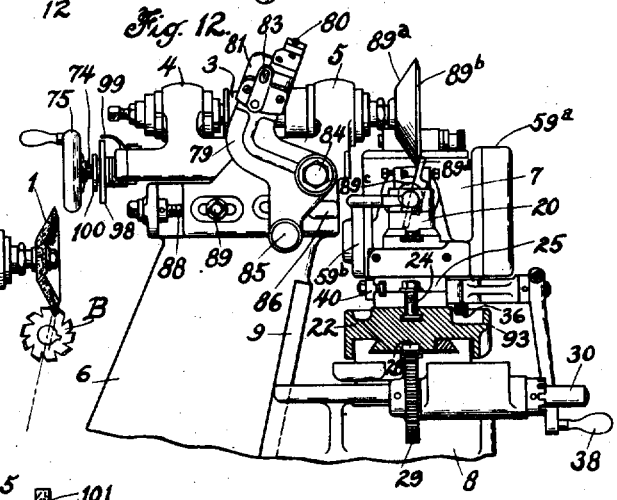
Fig. 12 is a fragmentary view partly in section along the line 12—12 of Fig. 11.

For the assistance of the operator in adjusting the dressing tool to the aforesaid fixed line, I preferably provide gaging devices such as are shown in Figs. 11 and 12. There is furnished a gage 89ᵃ made of metal and having the same shape as the grinding wheel, at least as concerns the conical surface 89ᵇ thereof. This gage is put in place on the spindle approximately in the position normally occupied by the wheel, as illustrated in Fig. 11. As a matter of convenience the dressing mechanism may be swung up to the position indicated in Fig. 12. The turntable 25 is adjusted to bring the axis of the two centers 16 and 17 at right angles to the spindle axis, as illustrated. There is provided a gage element 89ᶜ which is in the form of a shaft or pin adapted to be mounted on the centers 16 and 17. This shaft or pin 89ᶜ is provided with a notch near its center which has a plane bottom surface passing through the axis. A bar 89ᵈ is provided which has a straight edge which contacts with the plane bottom surface of the notch. It will be seen that the shaft or pin 89ᶜ, together with the bar 89ᵈ, can be freely swung about the axis of the centers. By means of the screw 74 and the hand wheel 75 the gage 89ᵃ can be moved axially, and this movement is effected in one way or the other as required to enable the straight edge of the bar 89ᵈ to lie flat against the conical surface of the gage 89ᵃ. When this adjustment has been made, the surface 89ᵇ of the gage occupies exactly the position which is to be afterward occupied by the surface 1ᵃ of the wheel, the surface of the gage at the bottom, if extended, intersecting the axis of the centers.

The gage 89ᵃ having been thus positioned, the dressing mechanism is moved to its lower position and is adjusted by means of the devices described so that the tool contacts with the surface 89ᵇ, as shown in Fig. 11. In the original construction of the machine the dressing tool has been mounted to move at an angle to the wheel axis, which angle is the same as that of the gage surface 89ᵇ. Therefore, when the dressing tool is adjusted to engage the said surface, it is in position to properly dress the wheel. After the dressing tool has been thus adjusted the gage 89ᵃ is removed and the wheel 1 put in place. No further adjustment of the dressing tool takes place and the wheel is moved up to the tool in order to effect whatever dressing is necessary.

The dressing tool will wear slightly as the result of its engagement with the wheel, and it will be understood that after wear has taken place the tool can be readjusted in the way already described, making use of the gage 89ᵃ.

Under some circumstances it may be desirable to remove one cutter holder and substitute another. These cutter holders may vary somewhat in construction with the result that the distance between the cutter axis and the top of the carriage 22 may vary. Inasmuch as the axis of the cutter must intersect the line of engagement between the wheel face and the cutter faces, it will be seen that the position of the wheel and also of the dressing tool must be changed for a cutter holder of different height. These changes in adjustment may be effected by adjusting the gage 89ᵃ in the way already described.

The machine preferably includes means whereby water may be delivered to the grinding wheel. For this purpose I provide a pump 90 adapted to be driven by a belt wheel 91. A discharge pipe 92 leads from the pump and from the pipe water can be led to the wheel by any usual or preferred means, such means not being shown in the drawings. The carriage 22 is provided with a peripheral flange 93 which serves to collect the water discharged from the wheel. The flange 93 is interrupted at 94 to permit the water to flow downward onto the turntable 25, which is provided with a peripheral flange 95. A drain pipe 96 extends downward from the turntable 25, thus conducting water to a trough 97 which is mounted on the main frame. The knee 8 is also provided with a peripheral flange, thus serving to collect water which may fall on the knee. From the knee the water is discharged through a spout 97ᵃ into the trough 97. This trough serves to conduct the water to a reservoir in the interior of the main frame, which is not shown. From this reservoir the water is withdrawn by the pump 90 and returned to the wheel.

In operation, the cutter to be ground is mounted in the usual way, as shown in Fig. 6. If necessary the carriage 22 is moved to bring the cutter into the proper general relationship to the wheel. The turntable 25 is turned to an angle corresponding to the inclination of the cutting faces and the proper gears 48 and 51 are selected to effect turning at the required rate. The two stops 40 are properly set in accordance with the position and length of the cutter. By means of the worm wheel 69 and the worm 68, the cutter is turned angularly, if necessary, to bring the faces into proper relation with the wheel.

Then by means of the crank 38 the table 19 and the cutter are moved back and forth to effect grinding of one tooth. After one tooth has been ground, the cutter is indexed and another tooth ground, this being repeated until all the teeth have been ground.

Cutters of various diameters must be ground and the machine can be readily adjusted to accommodate such cutters by raising or lowering the knee 8 and the cutter holder carried thereby. As before explained, this adjustment does not interfere with the intersection of the cutter axis with the line of contact between the conical grinding face and the cutter faces.

Fig. 6 shows the effect of the adjustment of the cutter holder for cutters of different diameters. The cutter A is shown in full lines in operative relation with the grinding wheel. A larger cutter is indicated by the dot-and-dash circle A′, it being observed that the centers of both of the cutters are in line with the surface of the wheel. If cutters with different degrees of inclination are met with, the machine can be adjusted accordingly by turning the turn table 25 and the attached parts about the vertical pivotal axis. This adjustment does not in any way interfere with the intersection last above referred to.

The wheel can be dressed from time to time by means of the dressing tool 80. This tool has a normally fixed operative position and no adjustment of the tool is required. The wheel itself is bodily moved up to the tool so as to maintain the grinding surface always in the same position.

In preliminarily adjusting the machine, the dressing tool can be moved to bring it into the correct position to bring about the before mentioned intersection of the line of grinding with the cutter axis. If it should be necessary at any time to remove the cutter holder and substitute another one with a different elevation, the dressing tool could be adjusted to adapt the conical grinding surface of the wheel to the new position of the cutter axis.

When the machine is to be used for grinding cutters with straight plane faces, the turntable 25 is adjusted to bring the cutter axis perpendicular to the wheel axis and the longitudinal movement of the cutter can be effected by moving the carriage 22 with the attached parts, the table 19 remaining fixed with respect to the saddle 21 and to the table. Thus the cutter can be moved without causing any angular movement thereof such as would occur if the table 19 were to be moved on the saddle.

Figure 13:
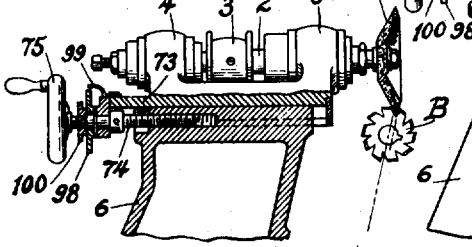
Fig. 13 is a fragmentary side view partly in section showing a different adjustment of the machine.

I have described the construction and operation of the machine in connection with cutters having the front faces of their teeth exactly radial. Frequently, however, cutters are made with the front faces of the teeth "undercut," that is, arranged so that instead of being radial they are spaced away from radial lines, as shown for instance at B in Fig. 13. The machine embodying my invention is equally well adapted for grinding cutters of this type. The dressing tool is set in the way already described and the grinding wheel is dressed in the usual manner. Then, after swinging the dressing tool out of operative position, the wheel is moved axially outward to the position shown in Fig. 13, being then ready to engage the undercut faces of the cutter teeth and grind them in the way already described in connection with the cutters with radial faces.

It is usually desirable to undercut the teeth by a definite amount which is predetermined when the cutter is originally made. It is therefore necessary to move the wheel outward beyond its normal position by a definite predetermined amount corresponding to the desired amount of undercut. In order that the amount of wheel movement may be accurately determined, I perferably provide a graduated disk 98 which is mounted on the outer part of the screw 74. Mounted on the slide 73 is an indicator 99 adapted to coöperate with the graduations on the disk. The graduations are such that the operator, after dressing the wheel in its normal position, can move it outward to any predetermined distance, which distance is measured by the disk graduations in connection with the pointer. Preferably, in order that the readings may start from zero, the disk is capable of turning on the screw. A nut 100 is provided for locking the disk to the screw after adjustment. In operation, the operator first dresses the wheel, moving it as required for this purpose. Then the disk 98 is adjusted to bring the zero mark thereon opposite the pointer 99. The disk is locked in place by means of the nut 100 and after that the wheel is moved outward, the amount of movement being indicated directly by the graduations on the disk.

Figure 14:
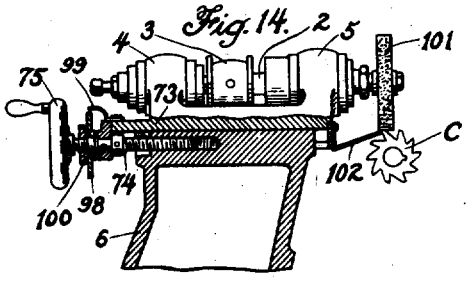
Fig. 14 is a fragmentary side view showing the machine arranged for grinding the peripheral faces of cutter teeth.

For some classes of work, cutters are made to be ground on their external or peripheral faces instead of on their radial faces. Such a cutter is shown at C in Fig. 14. The machine embodying the invention can be used for grinding such cutters by substituting a different, preferably, cylindrical, wheel, such as indicated at 101 in Fig. 14. The cutter is mounted on the centers in the usual way and is brought into engagement with the wheel by raising the knee and all of the parts carried thereby. If the cutter has straight teeth parallel with the axis, it can be moved back and forth underneath the wheel by moving the carriage 22. If the teeth are helical, the cutter can be turned during grinding by means of the turning devices already described. It will be understood that the proper gears 48 and 51 are selected to effect turning at the rate corresponding to the inclination of the teeth.

If preferred, instead of using the gearing for turning the cutter, use can be made of a stop 1 2 which is adapted to engage the front faces of the teeth. As the cutter is moved longitudinally it can be manually turned to hold the front face of the tooth being ground in engagement with the stop.

What I claim is:

1. The combination in a cutter grinding machine, of a grinding wheel rotatable about a horizontal axis and having a convex conical grinding face, a cutter holder having its axis intersecting and perpendicular to an element of the conical surface of the said grinding face, the said holder serving to present the front faces of the cutter teeth to the said grinding face, and means for effecting relative adjustment between the wheel and the cutter holder along lines parallel to the aforesaid element of the said conical surface.

2. The combination in a cutter grinding machine, of a rotatable grinding wheel having a convex conical grinding face, a cutter holder serving to present the front faces of the cutter teeth to the said grinding face, the holder being adjustable about a pivotal axis perpendicular to the wheel axis, and means for effecting relative adjustment between the wheel and the cutter holder along lines parallel to the line of engagement of the grinding face with the tooth faces.

3. The combination in a cutter grinding machine, of a rotatable grinding wheel having a convex conical grinding face, a cutter holder serving to present the front faces of the cutter teeth to the said grinding face, means upon which the holder is mounted for adjustment about a pivotal axis perpendicular to the wheel axis, and means for bodily adjusting the cutter holder and the pivotal mounting means therefor toward or from the wheel along lines parallel to the line of engagement of the grinding face with the tooth faces.

4. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis perpendicular to and intersecting the cutter axis, and means for effecting relative adjustment between the wheel and the cutter holder along lines parallel to the aforesaid element of the said conical surface.

5. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis intersecting the cutter axis, and means for effecting relative adjustment between the wheel and the pivotal axis of said cutter holder along lines parallel to the aforesaid element of the said conical surface.

6. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis perpendicular to and intersecting the wheel axis and also intersecting the aforesaid element of the said conical surface, and means for effecting relative adjustment between the wheel and the cutter holder along lines parallel to the said element.

7. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis intersecting the wheel axis and also intersecting the aforesaid element of the said conical surface, and means for effecting relative adjustment between the wheel and the pivotal axis of said cutter holder along lines parallel to the said element.

8. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis perpendicular to and intersecting both the cutter axis and the wheel axis and also intersecting the aforesaid element of the said conical surface, and means for effecting relative adjustment between the wheel and the cutter holder along lines parallel to the said element.

9. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis intersecting both the cutter axis and the wheel axis and also intersecting the aforesaid element of the said conical surface, and means for effecting relative adjustment between the wheel and the pivotal axis of said cutter holder along lines parallel to the said element.

10. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis perpendicular to and intersecting both the cutter axis and the wheel axis and also intersecting the aforesaid element of the said conical surface, and means for bodily adjusting the cutter holder toward or from the wheel along lines parallel to the said element.

11. The combination in a cutter grinding machine, of a rotatable grinding wheel having a convex conical grinding face, a cutter holder having its axis intersecting and perpendicular to an element of the conical surface of the said grinding face, the said holder serving to present the front faces of the cutter teeth to the said grinding face and being adjustable about a pivotal axis intersecting both the cutter axis and the wheel axis and also intersecting the aforesaid element of the said conical surface, and means for adjusting the pivotal axis of said cutter holder toward or from the wheel along lines parallel to the said element.

12. The combination in a cutter grinding machine, of a rotatable grinding wheel having a convex conical grinding face, a cutter holder having its axis intersecting and perpendicular to an element of the conical surface of the said grinding face, the said holder being movable longitudinally of the cutter axis and serving to present the front faces of the cutter teeth to the said grinding face, means upon which the holder is mounted for adjustment about a pivotal axis perpendicular to and intersecting both the cutter axis and the wheel axis and also intersecting the aforesaid element of the said conical surface, means for turning the cutter about its axis in proportion to the said longitudinal movement to effect the grinding of helicoidal cutting faces, and means for effecting relative adjustment betwen the wheel and the cutter holder along lines parallel to the said element.

13. The combination in a cutter grinding machine, of a rotatable grinding wheel having a convex conical grinding face, a cutter holder having its axis intersecting and perpendicular to an element of the conical surface of the said grinding face, the said holder being movable longitudinally of the cutter axis and serving to present the front faces of the cutter teeth to the said grinding face, means upon which the holder is mounted for adjustment about a pivotal axis intersecting both the cutter axis and the wheel axis and also intersecting the aforesaid element of the said conical surface, means for turning the cutter about its axis in proportion to the said longitudinal movement to effect the grinding of helicoidal cutting faces, and means for effecting relative adjustment between the wheel and the pivotal axis of said cutter holder along lines parallel to the said element.

14. The combination in a cutter grinding machine, of a rotatable grinding wheel having a convex conical grinding face, a cutter holder having its axis intersecting and perpendicular to an element of the conical surface of the said grinding face, the said holder being movable longitudinally of the cutter axis and serving to present the front faces of the cutter teeth to the said grinding face, means upon which the holder is mounted for adjustment about a pivotal axis perpendicular to and intersecting both the cutter axis and the wheel axis and also intersecting the aforesaid element of the said conical surface, means for turning the cutter about its axis in proportion to the said longitudinal movement to effect the grinding of helicoidal cutting faces, means for changing the rate of turning to conform to cutters with different degrees of inclination, and means for effecting relative adjustment between the wheel and the cutter holder along lines parallel to the said element.

15. The combination in a cutter grinding machine, of a rotatable grinding wheel having a convex conical grinding face, a cutter holder having its axis at an angle to the wheel axis, the said holder serving to present the front faces of the cutter teeth to the said grinding face, means for effecting relative adjustment between the wheel and the cutter holder longitudinally of the wheel axis to cause the perpendicular intersection of an element of the conical surface of the said grinding face with the cutter axis, and means for effecting relative adjustment between the wheel and the cutter holder along lines parallel to the aforesaid element of the said conical surface.

16. The combination in a cutter grinding machine, of a rotatable grinding wheel having a convex conical grinding face, a cutter holder having its axis at an angle to the wheel axis, the said holder serving to present the front faces of the cutter teeth to the said grinding face, means for bodily adjusting the wheel longitudinally of its axis to cause the perpendicular intersection of an element of the conical surface of the said grinding face with the cutter axis, and means for effecting relative adjustment between the wheel and the cutter holder along lines parallel to the aforesaid element of the said conical surface.

17. The combination in a cutter grinding machine, of a rotatable grinding wheel having a grinding face at an angle to the wheel axis, a cutter holder having its axis at an angle to the wheel axis, the said holder serving to present the front faces of the cutter teeth to the said grinding face, means for effecting relative adjustment between the wheel and the cutter holder longitudinally of the wheel axis to cause an element of the surface of the said grinding face to perpendicularly intersect the cutter axis or to lie at a distance therefrom, and means for determining the relation between the said element and the said axis.

18. The combination in a cutter grinding machine, of a rotatable grinding wheel having a convex conical grinding face, a cutter holder having its axis at an angle to the wheel axis, the said holder serving to present the front faces of the cutter teeth to the said grinding face, means for effecting relative adjustment between the wheel and the cutter holder longitudinally of the wheel axis to cause an element of the conical surface of the said grinding face to perpendicularly intersect the cutter axis or to lie at a distance therefrom, means for determining the relation between the said element and the said axis, and means for effecting relative adjustment between the wheel and the cutter holder along lines parallel to the aforesaid element of the said conical surface.

19. The combination in a cutter grinding machine, of a rotatable grinding wheel having a grinding face at an angle to the wheel axis, a cutter holder having its axis at an angle to the wheel axis, the said holder serving to present the front faces of the cutter teeth to the said grinding face, means for effecting relative adjustment between the wheel and the cutter holder longitudinally of the wheel axis to cause an element of the surface of the said grinding face to lie at a distance from the cutter axis, and means for measuring the said distance.

20. The combination in a cutter grinding machine, of a rotatable grinding wheel having a grinding face at an angle to the wheel axis, a cutter holder having its axis at an angle to the wheel axis; the said holder serving to present the front faces of the cutter teeth to the said grinding face, means including a screw for effecting relative adjustment between the wheel and the cutter holder longitudinally of the wheel axis to cause an element of the surface of the said grinding face to lie at a distance from the cutter axis, and means for measuring the said distance, the said means including a graduated disk carried by the screw.

21. The combination in a cutter grinding machine, of a rotatable grinding wheel having a convex conical grinding face, a cutter holder having its axis at an angle to the wheel axis, the said holder serving to present the front faces of the cutter teeth to the said grinding face, means to adjust said holder about an axis normal to the axis of the cutter, a stop adapted to engage the wheel at a point so positioned that an element of the conical surface of the said grinding face will perpendicularly intersect the cutter axis, and means for effecting relative adjustment between the wheel and the axis of said cutter holder along lines parallel to the aforesaid element of the said conical surface.

22. The combination in a cutter grinding machine, of a rotatable grinding wheel having a grinding face at an angle to the wheel axis, a cutter holder having its axis at an angle to the wheel axis, the said holder serving to present the front faces of the cutter teeth to the said grinding face, means for effecting relative adjustment between the wheel and the cutter holder longitudinally of the wheel axis, a stop adapted to engage the wheel at a point so positioned that an element of the surface of the said grinding face will perpendicularly intersect the cutter axis, and means for measuring any relative longitudinal adjustment beyond the position determined by the said stop.

23. The combination in a cutter grinding machine, of a rotatable grinding wheel having a grinding face at an angle to the wheel axis, a cutter holder having its axis at an angle to the wheel axis, the said holder serving to present the front faces of the cutter teeth to the said grinding face, and a dressing tool adapted to engage the wheel and movable along a normally fixed line so positioned that an element of the surface of the said grinding face after dressing will perpendicularly intersect the cutter axis.

24. The combination in a cutter grinding machine, of a rotatable grinding wheel having a grinding face at an angle to the wheel axis, a cutter holder having its axis at an angle to the wheel axis, the said holder serving to present the front face of the cutter teeth to the said grinding face, means to adjust said wheel in a direction parallel to its axis, and a dressing tool adapted to engage the wheel and movable along a normally fixed line so positioned that an element of the surface of the said grinding face after dressing will perpendicularly intersect the cutter axis.

25. The combination in a cutter grinding machine, of a rotatable grinding wheel having a convex conical grinding face at an angle to the wheel axis, a cutter holder having its axis at an angle to the wheel axis, the said holder serving to present the front faces of the cutter teeth to the said grinding face and being adjustable about a pivotal axis perpendicular to and intersecting the cutter axis, and a dressing tool adapted to engage the wheel along a normally fixed line so positioned that an element of the surface of the said grinding face after dressing will perpendicularly intersect the cutter axis and also intersect the pivotal axis.

26. The combination in a cutter grinding machine, of a rotatable grinding wheel having a convex conical grinding face, a cutter holder having its axis at an angle to the wheel axis, the said holder serving to present the front faces of the cutter teeth to the said grinding face, and a dressing tool adapted to engage the wheel along a normally fixed line so positioned that an element of the conical surface of the said grinding face after dressing will perpendicularly intersect the cutter axis.

27. The combination in a cutter grinding machine, of a rotatable grinding wheel having a convex conical grinding face, a cutter holder having its axis at an angle to the wheel axis, the said holder serving to present the front faces of the cutter teeth to the said grinding face, means to adjust said wheel in a direction parallel to its axis, and a dressing tool adapted to engage the wheel along a normally fixed line so positioned that an element of the conical surface of the said grinding face after dressing will perpendicularly intersect the cutter axis.

28. The combination in a cutter grinding machine, of a rotatable grinding wheel having a convex conical grinding face, a cutter holder having its axis at an angle to the wheel axis, the said holder serving to present the front faces of the cutter teeth to the said grinding face and being adjustable about a pivotal axis perpendicular to and intersecting the cutter axis, and a dressing tool adapted to engage the wheel along a normally fixed line so positioned that an element of the conical surface of the said grinding face after dressing will perpendicularly intersect the cutter axis and also intersect the pivotal axis.

29. The combination in a cutter grinding machine, of a rotatable grinding wheel having a convex conical grinding face, a cutter holder having its axis at an angle to the wheel axis, the said holder serving to present the front faces of the cutter teeth to the said grinding face, a dressing tool adapted to engage the wheel along a normally fixed line so positioned that an element of the conical surface of the said grinding face after dressing will perpendicularly intersect the cutter axis, and means for effecting relative adjustment between the wheel and the cutter holder along lines parallel to the aforesaid element of the said conical surface.

30. The combination in a cutter grinding machine, of a rotatable grinding wheel having a convex conical grinding face, a cutter holder having its axis at an angle to the wheel axis, the said holder serving to present the front faces of the cutter teeth to the said grinding face, means to adjust said holder about an axis normal to the axis of the cutter, a dressing tool adapted to engage the wheel along a normally fixed line so positioned that an element of the conical surface of the said grinding face after dressing will perpendicularly intersect the cutter axis, and means for effecting relative adjustment between the wheel and the axis of said cutter holder along lines parallel to the aforesaid element of the said conical surface.

31. The combination in a cutter grinding machine, of a rotatable grinding wheel having a convex conical grinding face, a cutter holder having its axis at an angle to the wheel axis, the said holder serving to present the front faces of the cutter teeth to the said grinding face and being adjustable about a pivotal axis perpendicular to and intersecting the cutter axis, a dressing tool adapted to engage the wheel along a normally fixed line so positioned that an element of the conical surface of the said grinding face after dressing will perpendicularly intersect the cutter axis and also intersect the pivotal axis, and means for effecting relative adjustment between the wheel and the cutter holder along lines parallel to the aforesaid element of the said conical surface.

32. The combination in a cutter grinding machine, of a rotatable grinding wheel having a grinding face at an angle to the wheel axis, a cutter holder having its axis at an angle to the wheel axis, the said holder serving to present the front faces of the cutter teeth to the said grinding face, a dressing tool adapted to engage the wheel along a normally fixed line so positioned that an element of the surface of the said grinding face after dressing will perpendicularly intersect the cutter axis, means for adjusting the wheel longitudinally of its axis to bring it into engagement with the dressing tool, and means for measuring any longitudinal adjustment of the wheel beyond the position of dressing.

33. The combination in a cutter grinding machine, of a rotatable grinding wheel having a convex conical grinding face, a cutter holder having its axis below and at an angle to the wheel axis, the said holder serving to present the front faces of the cutter teeth to the said grinding face, and a dressing tool adapted to engage the wheel along a normally fixed horizontal line so positioned that an element of the conical surface of the said grinding face after dressing will perpendicularly intersect the cutter axis.

34. The combination in a cutter grinding machine, of a rotatable grinding wheel having a convex conical grinding face, a cutter holder having its axis at an angle to the wheel axis, the said holder serving to present the front faces of the cutter teeth to the said grinding face, and a dressing tool adapted to engage the wheel along a normally fixed line so positioned that an element of the conical surface of the said grinding face after dressing will perpendicularly intersect the cutter axis, the dressing tool being movably mounted so that it may be moved out of operative position when not in use.

35. The combination in a cutter grinding machine, of a rotatable grinding wheel having a convex conical grinding face, a cutter holder having its axis at an angle to the wheel axis, the said holder serving to present the front faces of the cutter teeth to the said grinding face, a dressing tool adapted to engage the wheel along a normally fixed line, and means for adjusting both the wheel and the dressing tool bodily along lines parallel with the wheel axis to bring about the perpendicular intersection of an element of the conical surface of the said grinding face with the cutter axis.

36. The combination in a cutter grinding machine, of a rotatably grinding wheel having a grinding face at an angle to the wheel axis, a cutter holder having its axis at an angle to the wheel axis, the said holder serving to present the front faces of the cutter teeth to the said grinding face, a dressing tool adapted to engage the wheel along a straight line, means for adjusting the dressing tool bodily along lines parallel with the wheel axis, and a gage adapted to be so located that the dressing tool when brought into contact with it will be in position to dress the wheel so as to bring about the perpendicular intersection of an element of the surface of the said grinding face with the cutter axis.

37. The combination in a cutter grinding machine, of a rotatable grinding wheel having a convex conical grinding face, a cutter holder having its axis at an angle to the wheel axis, the said holder serving to present the front faces of the cutter teeth to the said grinding face, a dressing tool adapted to engage the wheel along a straight line, means for adjusting the dressing tool bodily along lines parallel with the wheel axis, and a gage adapted to be so located that the dressing tool when brought into contact with it will be in position to dress the wheel so as to bring about the perpendicular intersection of an element of the conical surface of the said grinding face with the cutter axis.

38. The combination in a cutter grinding machine, of a rotatable spindle, a grinding wheel on the spindle having a grinding face at an angle to the wheel axis, a cutter holder having its axis at an angle to the wheel axis, the said holder serving to present the front faces of the cutter teeth to the said grinding face, a dressing tool adapted to engage the wheel along a normally fixed line, means for adjusting the dressing tool bodily along lines parallel with the wheel axis, and a gage adapted to be placed on the wheel spindle approximately in the position normally occupied by the wheel, the said gage to be so located and shaped that the dressing tool when brought into contact with it will be in position to dress the wheel so as to bring about the perpendicular intersection of an element of the surface of the said grinding face with the cutter axis.

39. The combination in a cutter grinding machine, of a rotatable spindle, a grinding wheel on the spindle having a convex conical grinding face, a cutter holder having its axis at an angle to the wheel axis, the said holder serving to present the front faces of the cutter teeth to the said grinding face, a gage adapted to be placed on the spindle approximately in the position normally occupied by the wheel, the gage having a convex conical surface similar to that of the wheel, a gage element including a bar adapted to be positioned with a straight edge surface thereof passing through the normal line of the cutter axis, means for moving the spindle longitudinally to adjust the conical surface of the gage into line contact with the straight edge surface of the bar, a wheel dressing tool adapted to contact with the gage, and means for bodily adjusting the tool to bring it into position for movement along the conical surface of the gage after the gage has been adjusted as before stated.

In testimony whereof, I hereto affix my signature.

FRIEDERICH MÜLLER.